(12) United States Patent
Zipf et al.

(10) Patent No.: US 12,362,658 B2
(45) Date of Patent: Jul. 15, 2025

(54) ELECTRONICS UNIT FOR AN ELECTRICAL DEVICE

(71) Applicant: Robert Bosch GmbH, Stuttgart (DE)

(72) Inventors: Philipp Zipf, Stuttgart (DE); Soenke Schuch, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 18/263,069

(22) PCT Filed: Dec. 29, 2021

(86) PCT No.: PCT/EP2021/087800
§ 371 (c)(1),
(2) Date: Jul. 26, 2023

(87) PCT Pub. No.: WO2022/161732
PCT Pub. Date: Aug. 4, 2022

(65) Prior Publication Data
US 2024/0088783 A1 Mar. 14, 2024

(30) Foreign Application Priority Data
Jan. 28, 2021 (DE) ..................... 10 2021 200 781.3

(51) Int. Cl.
*H01F 27/29* (2006.01)
*H02M 1/00* (2006.01)
*H02M 1/34* (2007.01)

(52) U.S. Cl.
CPC ........... *H02M 1/348* (2021.05); *H02M 1/009* (2021.05)

(58) Field of Classification Search
CPC ........ H02M 1/348; H02M 1/009; H02M 1/34; H02M 7/003; H02M 7/48
See application file for complete search history.

(56) References Cited

U.S. PATENT DOCUMENTS 5,258,902 A 11/1993 Lindbery et al.
5,892,677 A 4/1999 Chang
(Continued)

FOREIGN PATENT DOCUMENTS

| EP | 3 163 733 A1 | 5/2017 |
| JP | S58-133175 A | 8/1983 |
| JP | 2008-118784 A | 5/2008 |

OTHER PUBLICATIONS

International Search Report corresponding to PCT Application No. PCT/EP2021/087800, mailed May 2, 2022 (German and English language document) (7 pages).
(Continued)

*Primary Examiner* — Muhammad S Islam
(74) *Attorney, Agent, or Firm* — Maginot, Moore & Beck LLP

(57) ABSTRACT

An electronics unit for an electrical device, in particular for a motor-operated electrical device, includes a printed circuit board populated, in particular on one side, and having a plurality of power transistors for actuating a multiphase load, in particular a multiphase electric motor, of the electrical device. Each phase of the load is assigned at least one power transistor. A first electrical damping element for damping transients caused by switching processes of the power transistors is connected in parallel with at least one of the power transistors of a first phase with a highest leakage inductance. No electrical damping element acting in this manner is provided for at least one of the other phases of the load, in particular for the phase with a lowest leakage inductance.

12 Claims, 8 Drawing Sheets

(56) References Cited

U.S. PATENT DOCUMENTS

| | | |
|---|---|---|
| 2003/0205990 A1* | 11/2003 | Wittenbreder, Jr. .. H02M 3/158 323/222 |
| 2005/0099278 A1* | 5/2005 | Kawaura ............... B60R 21/013 324/207.26 |
| 2007/0216385 A1 | 9/2007 | Quazi |
| 2008/0246577 A1* | 10/2008 | Sullivan .................. H01F 17/06 336/184 |
| 2011/0148560 A1* | 6/2011 | Ikriannikov .......... H01F 27/306 336/192 |
| 2013/0293008 A1 | 11/2013 | Quigley |
| 2017/0126115 A1 | 5/2017 | Schulz et al. |
| 2018/0269793 A1 | 9/2018 | Ahsanuzzaman et al. |

OTHER PUBLICATIONS

Kim et al., "A Generalized Undeland Snubber for Flying Capacitor Multilevel Inverter and Converter" IEEE Transactions on Industrial Electronics, IEEE Service Center, Piscataway, NJ, USA. Vol. 51, No. 6, Dec. 1, 2004 (Dec. 1, 2004), pp. 1290-1296 (7 pages).

Finney et al., "RCD Snubber Revisited", IEEE Transactions on Industry Applications, 1996, pp. 155-160, vol. 32, No. 1 (6 pages).

\* cited by examiner

ELECTRONICS UNIT FOR AN ELECTRICAL DEVICE

This application is a 35 U.S.C. § 371 National Stage Application of PCT/EP2021/087800, filed on Dec. 29, 2021, which claims the benefit of priority to Serial No. DE 10 2021 200 781.3,filed on Jan. 28, 2021 in Germany, the disclosures of which are incorporated herein by reference in their entirety.

The disclosure relates to an electronics unit for an electrical device. In addition, the disclosure relates to an electrical device having an electronics unit according to the disclosure.

BACKGROUND

From US 2018/0269793 A1 an electronics unit configured as an inverter for switching an electrical load by means of several power transistors for each phase of the load is known. The electronics unit has one high-side and one low-side transistor switch per phase to actuate the load by pulse-width modulated signal (PWM). However, the switching processes of the power transistors usually cause voltage peaks or transients, which can lead to electromagnetic interference for other electrical components and possibly to their destruction. The power transistors themselves can also be affected. To avoid this, a damping element (a so-called snubber) consisting of at least one capacitor and one diode is provided for each phase to attenuate the voltage peaks or transients.

As a rule, such electronics units for switching electrical loads are configured as a printed circuit board with components mounted on it and connected via conductor tracks. The amplitudes of the transients then depend, among other things, on the change in the load current over time (dI/dt), which in turn is a PCB-specific parameter in the form of the leakage inductance of the PCB and the bandwidth as well as the characteristic properties of the components used.

In addition to the use of snubbers, other measures known from the prior art can also help to reduce switching voltage peaks or increase the electromagnetic compatibility of a corresponding electronics unit. For example, it is possible to use power transistors with a high overvoltage resistance and/or lower switching times. However, the former leads to increased costs, since corresponding power transistors are significantly more expensive, while the latter results in higher switching losses and also prohibits use for certain applications with special requirements for the shortest possible switch-on and switch-off times of the power transistors. The application of snubbers for each phase of the electronics unit, on the other hand, has the disadvantage that, on the one hand, more installation space is required on the circuit board and, on the other hand, thermal losses occur in the snubbers.

If the circuit board of the electronics unit can only be populated on one side, a snubber cannot be provided on the other side of the circuit board, which in turn means that the dimensions of the electronics unit must be increased, since a snubber must be positioned as close as possible to the semiconductor switch or power transistor to be protected in order to achieve the best possible interference suppression. Each additional snubber can then also increase the leakage inductance of the respective phase.

It is the task of the disclosure, based on the known prior art, to provide an electronics unit for an electrical device which ensures sufficient suppression of the transients of power transistors for a multi-phase, electrical load with minimum installation space, in particular a printed circuit board populated on one side.

SUMMARY

The disclosure relates to an electronics unit for an electrical device, in particular for a motor-operated electrical device, having a printed circuit board which is in particular populated on one side and has a plurality of power transistors for actuating a multiphase load, in particular a multiphase electric motor, of the electrical device, wherein each phase of the load is assigned at least one power transistor. According to the disclosure, it is provided that a first electrical damping element for damping transients caused by the switching processes of the power transistors is connected in parallel with at least one of the power transistors of a first phase with the highest leakage inductance and that no electrical damping element acting in this manner is provided for at least one of the other phases, in particular for the phase with the lowest leakage inductance. Advantageously, the targeted application of snubbers only for certain power transistors can effectively reduce or avoid transients in critical components with the smallest possible installation space of the electronics unit. The disclosure thus also enables fast switching of the power transistors actuating the electrical load in conjunction with high reliability. The disclosure is particularly advantageous for so-called IMS printed circuit boards (Insulated Metal Substrates) due to their single-sided population (single layer). Moreover, in this way the total leakage inductance of all phases is not increased. However, the disclosure can also be applied in electronics units with multilayer printed circuit boards by designing the damping element network taking into account the leakage inductance and the load current variation dI/dt of the particular application.

In the context of the disclosure, electrical devices are to be understood as all electrically operated appliances which can be supplied by mains current or energy storage, such as batteries, exchangeable battery packs or permanently integrated rechargeable batteries, with a multiphase load, in particular with a multiphase electric motor, in which the electronics unit according to the disclosure can be used to attenuate disturbances caused by the switching processes of its power transistors. Electrically commutated motors (so-called EC or BLDC motors) are particularly suitable as electromotive drives, the individual phases of which are actuated via the power transistors of the electronics unit by pulse width modulation to control or regulate their speed and/or torque. For example, the disclosure can be applied to power tools for machining workpieces by means of an insert tool driven by an electric motor, such as hand-held or stationary drills, screwdrivers, percussion drills, hammer drills, planers, angle grinders, orbital sanders, polishing machines, circular saws, table saws, cross-cut saws and jigsaws or the like. But also in household appliances, such as vacuum cleaners, mixers, kitchen machines, hobs or the like, gardening equipment, such as lawn mowers, shredders, branch saws, etc., construction machinery, such as concrete mixers or electric motor-driven vehicles and aircraft, etc., an application of the disclosure is conceivable.

The term printed circuit board can comprise both a fixed and a flexible board with printed or etched conductor tracks, in particular copper conductor tracks, wherein the board is configured in such a way that it carries one or more passive or active electronic components in the form of resistors, capacitors, coils, diodes, transistors, integrated circuits, etc.

The disclosure is particularly advantageous for so-called IMS printed circuit boards (Insulated Metal Substrate) due to their single-sided population (single layer). The configuration possibilities of such printed circuit boards will not be discussed in detail here, as they are sufficiently well known to the skilled person.

The power transistors of the electronics unit are preferably configured as MOSFETs. However, power transistors in the form of other field-effect transistors, bipolar transistors, IGBTs or the like can also be considered.

In a further development of the disclosure, it is provided that each phase of the load is assigned a high-side power transistor connected to a first reference potential, in particular a supply potential, and a low-side power transistor connected to a second reference potential, in particular an electrical ground. In the case of a three-phase electric motor, the electronics unit is thus configured as a B6 power bridge. The first electrical damping element is then connected in parallel with the low-side power transistor or the high-side power transistor of the first phase. However, other circuit topologies are also conceivable, such as an H-bridge or only a single power transistor per phase.

In addition, at least a second electrical damping element is connected in parallel with the low-side power transistor or the high-side power transistor of a second phase. Preferably, the second phase has the second highest leakage inductance. Thus, the components, especially the power transistors, for switching the first phase with the highest leakage inductance and the components, especially the power transistors, for switching the second phase with the second highest leakage inductance are protected. In the case of a three-phase load, this has a particular advantage in that, on the one hand, there is no influence on the leakage inductance of the third phase, while, on the other hand, only a little more space is required on the printed circuit board of the electronics unit.

The parallel connection of the electrical damping elements to the power transistors of the first and second phases also increases their leakage inductances and internal resistances in each case. Therefore, in an alternative configuration of the disclosure, the at least one second electrical damping element is connected between the first phase and the second phase. Accordingly, an electrical damping element connected in parallel to a power transistor of one phase shall be referred to as a vertical snubber and an electrical damping element connected between two power transistors of two phases as a horizontal snubber. With particular advantage, in addition to the phase with the highest leakage inductance, the phase with the highest electrical and thermal load can thus be protected against transients during the switching processes of the corresponding power transistors. Furthermore, the horizontal snubber does not increase the leakage inductances of the phases and it is possible to further reduce the installation space of the electronics unit by combining it with the vertical snubber compared to the solution with multiple horizontal snubbers.

In a further configuration of the disclosure, it is provided that the at least one second electrical damping element configured as a horizontal snubber is connected between the two phases in such a way that it is connected to a node between the low-side and the high-side power transistor of each phase.

To avoid a wrongly directed, high current flow between the individual phases, at least the second electrical damping element configured as a horizontal snubber is constructed as an RDC element with at least one resistor, one diode and one capacitor each.

In particular in connection with a three-phase load, it is provided that for the second phase additionally at least a third damping element configured as a horizontal snubber is provided which acts with respect to a third phase. Thus, transients of the second phase can be attenuated by appropriate poling of the diodes of the horizontal snubbers depending on the PWM clocking in both current flow directions across the first and third phases.

The disclosure further relates to an electrical device, in particular a motor-driven electrical device, with an electronics unit according to the disclosure for actuating a multiphase load, in particular a multiphase electric motor. In this case, the multiphase load can be configured in particular as a three-phase EC motor, wherein in this case the electronics unit has a B6 power bridge for actuating the EC motor. However, as mentioned above, depending on the configuration of the multiphase load, other circuit topologies such as an H-bridge or a single power transistor per phase may also be considered.

BRIEF DESCRIPTION OF THE DRAWINGS

The disclosure is explained below with reference to FIGS. 1 through 7 by way of example, wherein identical reference numbers in the drawings indicate identical components having an identical function.

Shown are.

DETAILED DESCRIPTION

Figure 1:
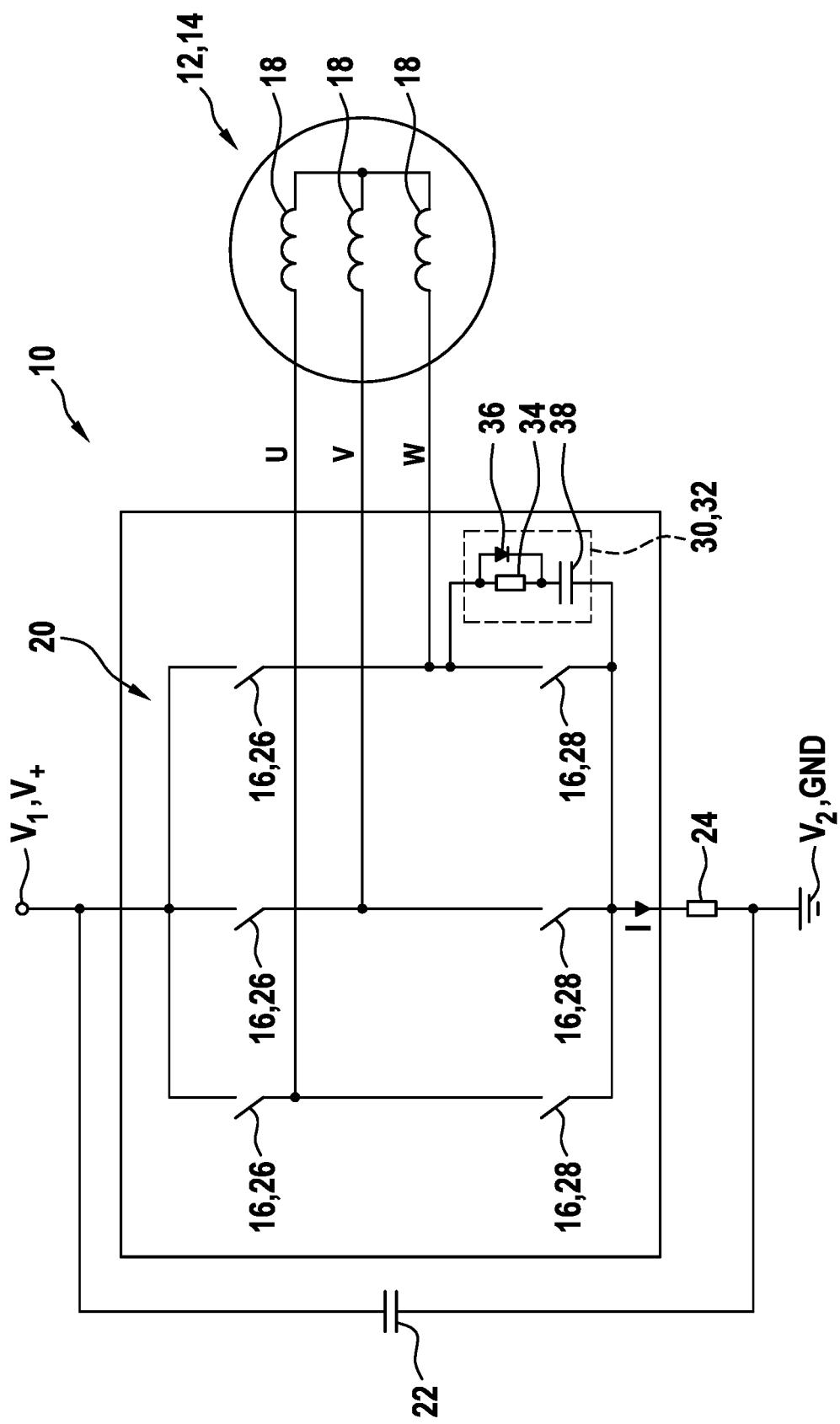
FIG. 1: a circuit diagram of the electronics unit according to the disclosure for actuating a three-phase electric motor in a first embodiment.

FIG. 1 shows a circuit diagram of a first embodiment example of the electronics unit 10 according to the disclosure for an electrical device not shown in more detail. As mentioned at the outset, an electrical device in the context of the disclosure can be understood as any electrically operated appliance which can be supplied by mains current or energy storage, such as batteries, exchangeable battery packs or permanently integrated rechargeable batteries, with a multiphase load 12, in particular with a multiphase electric motor 14, in which the electronics unit 10 can be used to attenuate disturbances caused by the switching processes of its power transistors 16. For example, the electronics unit 10 can be applied to power tools for machining workpieces by means of an insert tool driven by an electric motor, such as hand-held or stationary drills, screwdrivers, percussion drills, hammer drills, planers, angle grinders, orbital sanders, polishing machines, circular saws, table saws, chop saws, jigsaws, or the like. But also in household appliances, such as vacuum cleaners, mixers, kitchen machines, hobs or the like, gardening equipment, such as lawn mowers, shredders, branch saws, etc., construction machinery, such as concrete mixers or electric motor-driven vehicles and aircraft, etc., an application of the electronics unit 10 is conceivable.

The power transistors 16 of the electronics unit 10 are used to actuate the individual phases U, V, W of the electric motor 14 by means of a pulse-width modulated signal (PWM). Here, 18 designates the windings of electric motor 14 associated with phases U, V, W. The windings 18 of a phase U, V, W can also be distributed over several stator teeth, which are not shown, of a stator of the electric motor 14 configured as an EC motor, wherein the stator teeth of a phase U, V, W in each case form a stator pole. The power transistors 16 of the electronics unit 10 define a so-called power bridge 20, which is supplied with a first reference potential $V_1$, in particular a supply potential $V_+$, and with a second reference potential $V_2$, in particular a ground potential GND. By means of at least one filter capacitor 22 connected between the first reference potential $V_1$ and the second reference potential $V_2$, high-frequency disturbances which drop across the electronics unit 10 can be filtered out. A shunt resistor 24 is used to measure the load current I that is converted in the windings 18 of the electric motor 14.

The windings 18 of the electric motor 14, which are connected in a star circuit, are switched by means of a power bridge 20, which is configured as a B6 power bridge and has a high-side power transistor 26 and a low-side power transistor 28 for each phase U, V, W. The power transistors 16, which are preferably in the form of MOSFETs, can each be actuated via a control contact, in particular a gate terminal, which is not shown in more detail, to generate the PWM signal by control or regulating electronics which are also not shown in more detail.

The PWM actuating of the windings 18 of the stator poles of the electric motor 14 by means of the B6 power bridge 20 is performed in a known manner in such a way that the high-side and low-side power transistors 26 and 28 of a phase U, V, W, respectively, are switched on and off alternately with respect to each other, and that the switching on and off of the power transistors 16 from one phase to the next is performed with a phase offset of 120° el. so that the energization of the windings 18 leads to a corresponding rotary motion of a rotor of the electric motor 14. Since the PWM actuating of an electric motor by means of a B6 power bridge 20 is sufficiently known to the person skilled in the art, however, this will not be discussed further. Rather, it is essential for the invention disclosure that, due to the switching processes of the power transistors 16, voltage peaks or transients generally occur which can lead to electromagnetic interference for further electrical components and possibly to their destruction. In addition to a B6 power bridge 20, other switching topologies such as an H-bridge or a single power transistor per phase are also possible, depending on the multiphase load 12 to be actuated.

According to the disclosure, it is provided that at least one of the power transistors 16 of a first phase W with the highest leakage inductance has an electrical damping element or a so-called snubber 30 connected in parallel for attenuating the transients caused by the switching processes of the power transistors 16, and that at least one of the other phases U, V, in particular the phase with the lowest leakage inductance, has no such electrical damping element 30. The parallel connection of the damping element 30 to at least one of the power transistors 16 shall also be referred to hereinafter as the vertical snubber 32. In the embodiment example shown, the vertical snubber 32 is connected in parallel with the low-side power transistor 28 of the first phase W and consists essentially of at least one resistor 34, a diode 36 connected in parallel therewith, and a capacitor 38 connected in series with the parallel circuit formed by the resistor 34 and the diode 36. Accordingly, the vertical snubber 32 is constructed as an RDC element. By the targeted application of a vertical snubber 32 only to a power transistor 16 of phase W with the highest leakage inductance, it is possible to achieve quite effective attenuation of the transients in critical components with the smallest possible installation space of the electronics unit 10. Instead of being an RDC element, such a vertical snubber 32 can also be configured as an RC element, i.e. with a series connection of resistor 34 and capacitor 38, to further reduce the required installation space. The dimensions of resistor 34 and capacitor 38 must be adapted to the switching times of the associated power transistor 16 in such a way that capacitor 38 can discharge sufficiently when power transistor 16 is closed.

Figure 2:
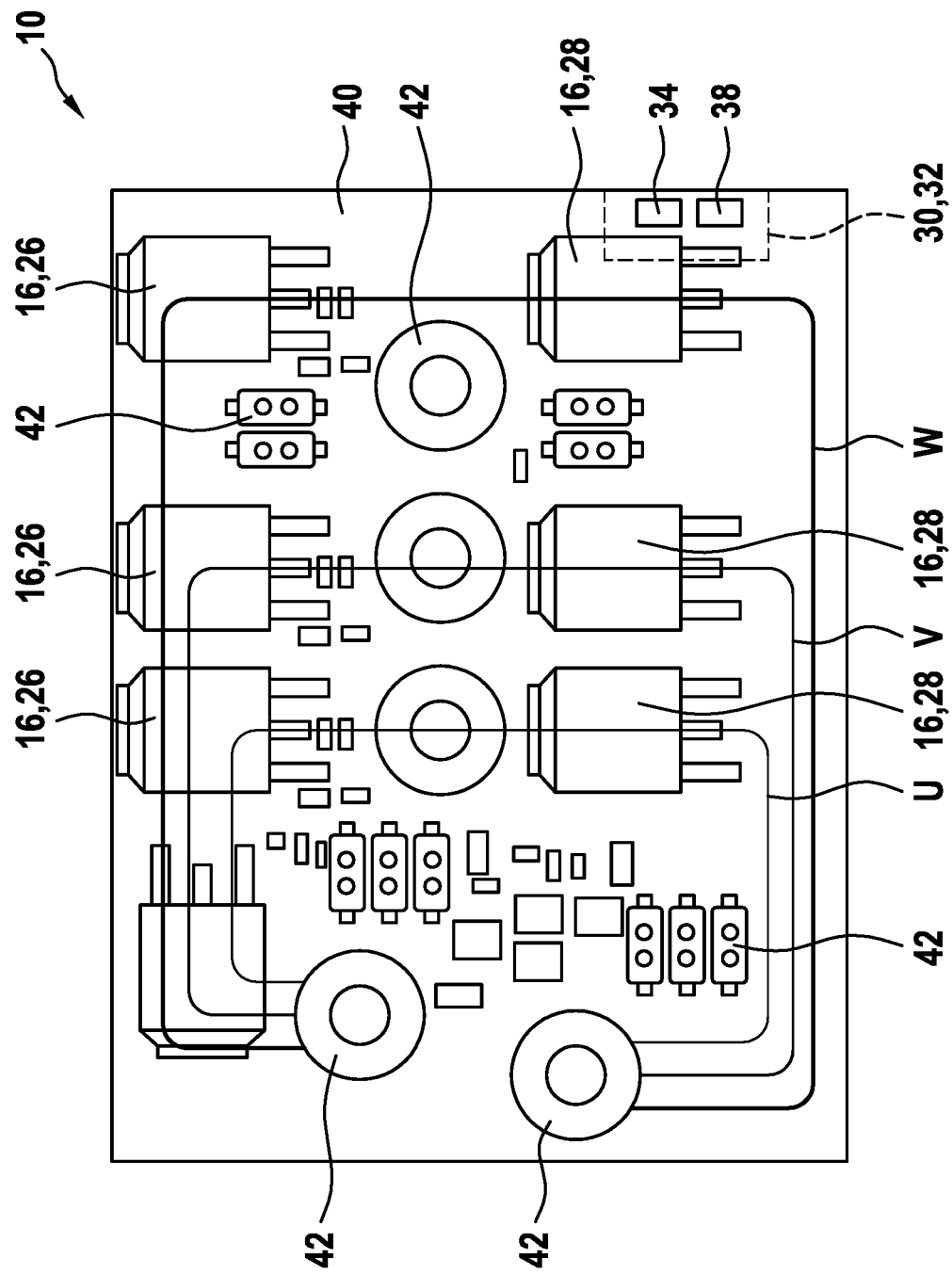
FIG. 2: a schematic representation of the electronics unit according to the disclosure with a printed circuit board according to FIG. 1, FIG. 3: a circuit diagram of the electronics unit according to the disclosure for actuating a three-phase electric motor in a second embodiment.

The disclosure is particularly advantageous for so-called IMS printed circuit boards (Insulated Metal Substrates) due to their single-sided population (single layer). FIG. 2 shows such a printed circuit board 40 of the electronics unit 10 according to FIG. 1. In addition to other electronic components in the form of capacitors, resistors, fuses, etc., to name just a few examples, the high-side power transistors 26 and the low-side power transistors 28 are also arranged or soldered on it in SMD technology (Surface Mounted Device) for actuating the individual phases U, V, W of the three-phase load 14 not shown here. Furthermore, various plug-in and screw connections 42 are provided on the printed circuit board 40 for the power supply of the electronics unit 10 and for the control signals of the power transistors 16 as well as for contacting the windings 18 of the electric motor 14.

According to FIG. 1, the printed circuit board 40 has a vertical snubber 32 connected in parallel to the low-side power transistor 28 of phase W with the highest leakage inductance, but here it is a simple RC element with a resistor 34 and a capacitor 38. Thus, a very small installation space of the electronics unit 10 can be achieved with the most effective damping of the switching transients without increasing the total leakage inductance of all phases U, V, W.

Figure 3:
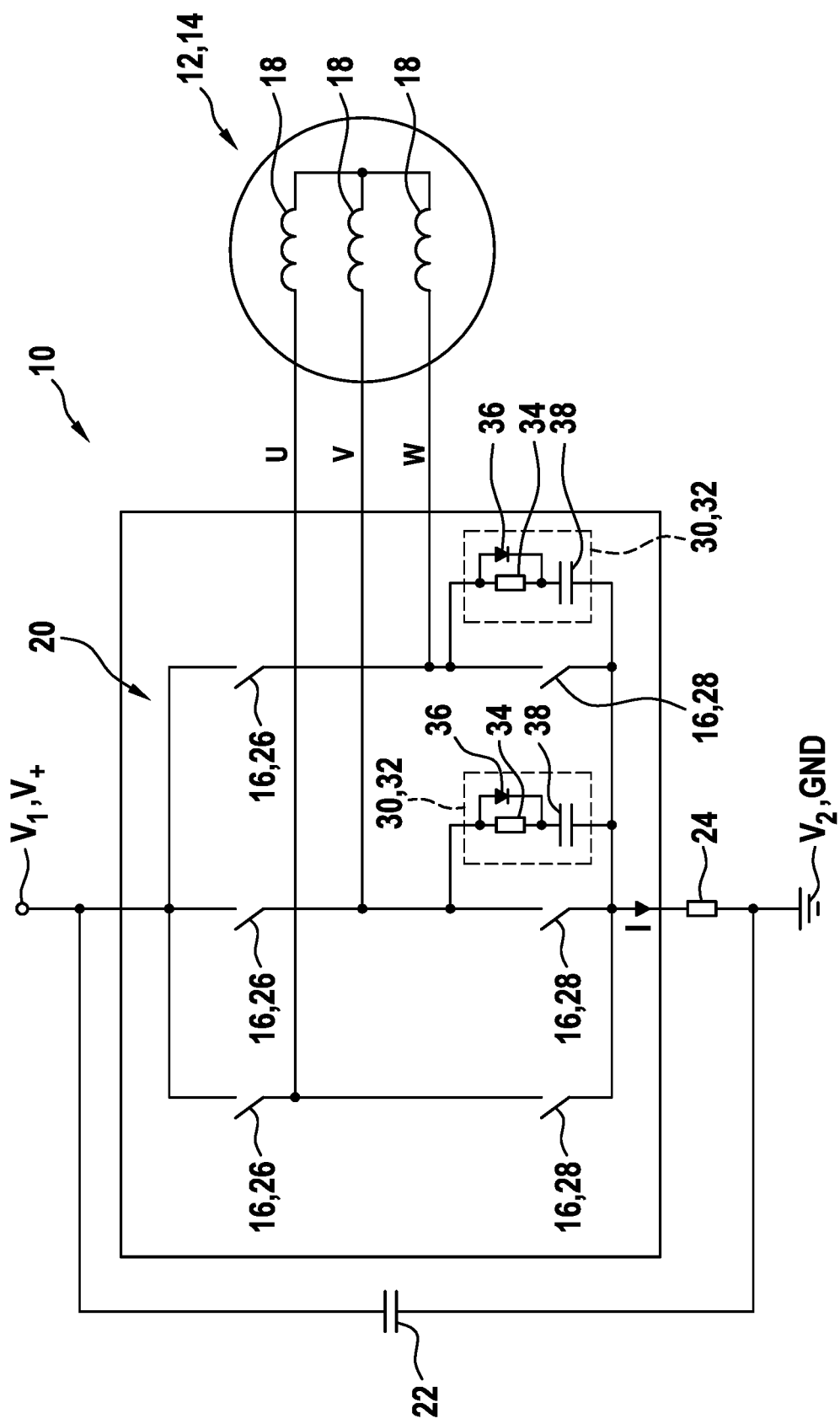

FIG. 3 shows a circuit diagram of a second embodiment example of the electronics unit 10 according to the disclosure, which differs from the first embodiment example according to FIGS. 1 and 2 only in that now, in addition to the first phase W with the highest leakage inductance, a vertical snubber 32 is also assigned to a further phase W, in particular the phase with the second highest leakage inductance. Analogous to the vertical snubber 32 of the first phase W, this is also formed as an RDC element with a resistor 34, a diode 36 connected in parallel with it and a capacitor 38 connected in series with the parallel circuit formed by the resistor 34 and the diode 36. The remaining components of FIG. 3 will not be discussed further here, as their operation corresponds to that of the first embodiment example. In addition, it should be noted that the vertical snubber 32 may also be formed as an RC element in this case.

Figure 4:
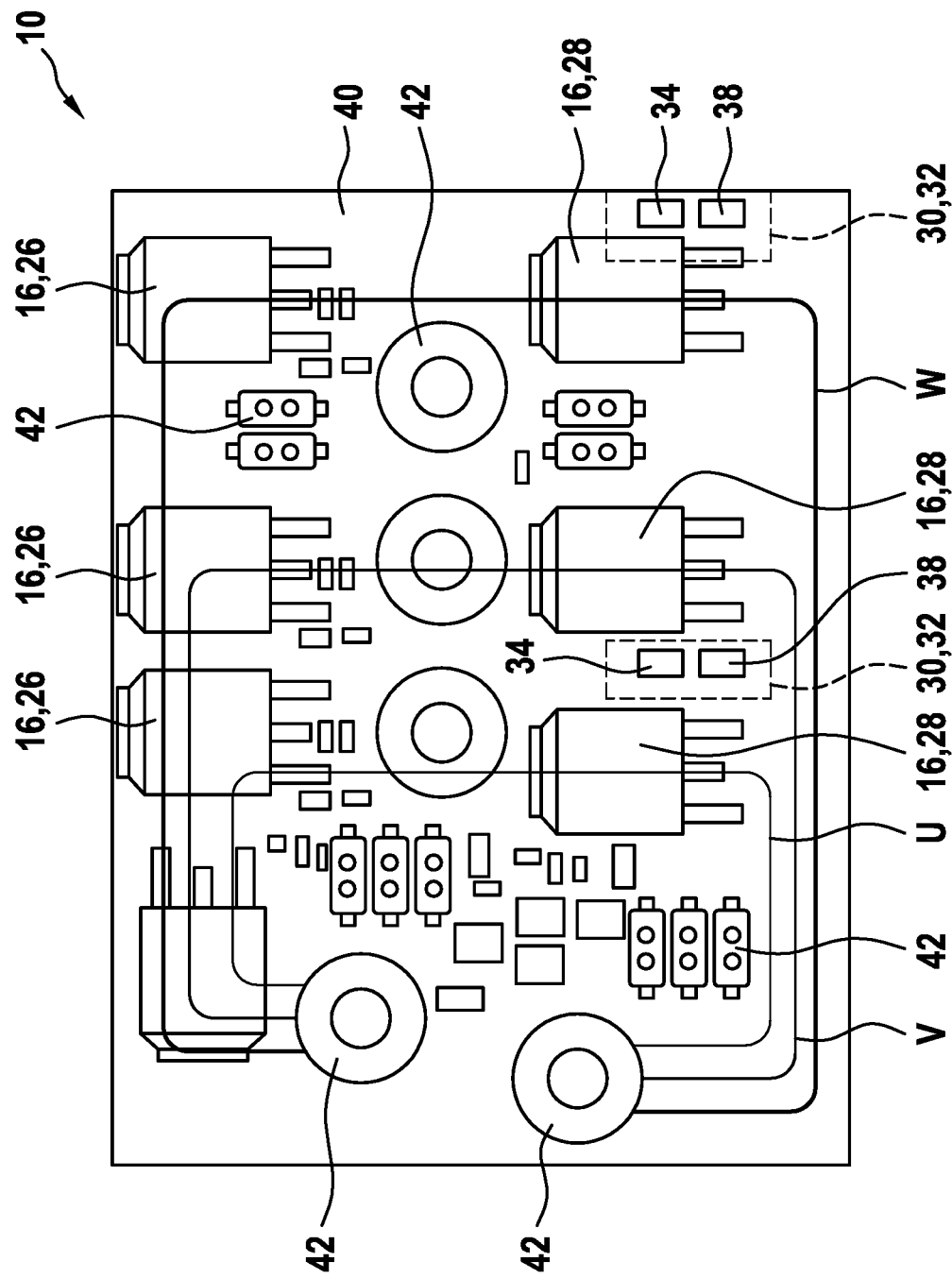
FIG. 4: a schematic representation of the electronics unit according to the disclosure with a printed circuit board according to FIG. 3, FIG. 5: a circuit diagram of the electronics unit according to the disclosure for actuating a three-phase electric motor in a third embodiment.

Thus, the components of the electronics unit 10, in particular the power transistors 16, for switching the first phase W with the highest leakage inductance and the components, in particular the power transistors 16, for switching the second phase V with the second highest leakage inductance are protected. In the case of a three-phase load 14, this has, with particular advantage, on the one hand no influence on the leakage inductance of the third phase U, while on the other hand only a little more space is required on the printed circuit board 40 of the electronics unit 10, as FIG. 4 illustrates.

The parallel connection of the horizontal snubbers 32 to the power transistors 16 of the first and second phases W, V respectively also increases their leakage inductances and internal resistances. Therefore, in a third embodiment example of the disclosure according to FIGS. 5 and 6, it is provided that in addition to the vertical snubber 32 of the first phase W, at least a second electrical damping element 30 is connected as a horizontal snubber 44 between the first and second phases W, V in such a way that it is connected to a node 46 between the low-side power transistor 28 and the high-side power transistor 26 of the first phase W and the second phase V, respectively. In contrast to the two previous embodiment examples, the windings 18 of the stator poles of the electric motor 14 are connected in a delta connection. However, this has only a minor effect on the operation of the electronics unit 10 and the electrical damping elements 30. With particular advantage, the additional horizontal snubber 44 can protect not only the phase W with the highest leakage inductance but also the phase V with the highest electrical and thermal load against the transients caused by the switching processes of the corresponding power transistors 16. Furthermore, the horizontal snubber 44 does not increase the leakage inductances of the phases U, V, W and it is possible to further reduce the installation space of the electronics unit 10 by combining it with the vertical snubber 32 compared to the solution with multiple horizontal snubbers. To avoid misdirected high current flow between the two phases V and W, the horizontal snubber 44 must be constructed as an RDC element with at least one resistor 34, one diode 36 and one capacitor 38 each.

Figure 5:
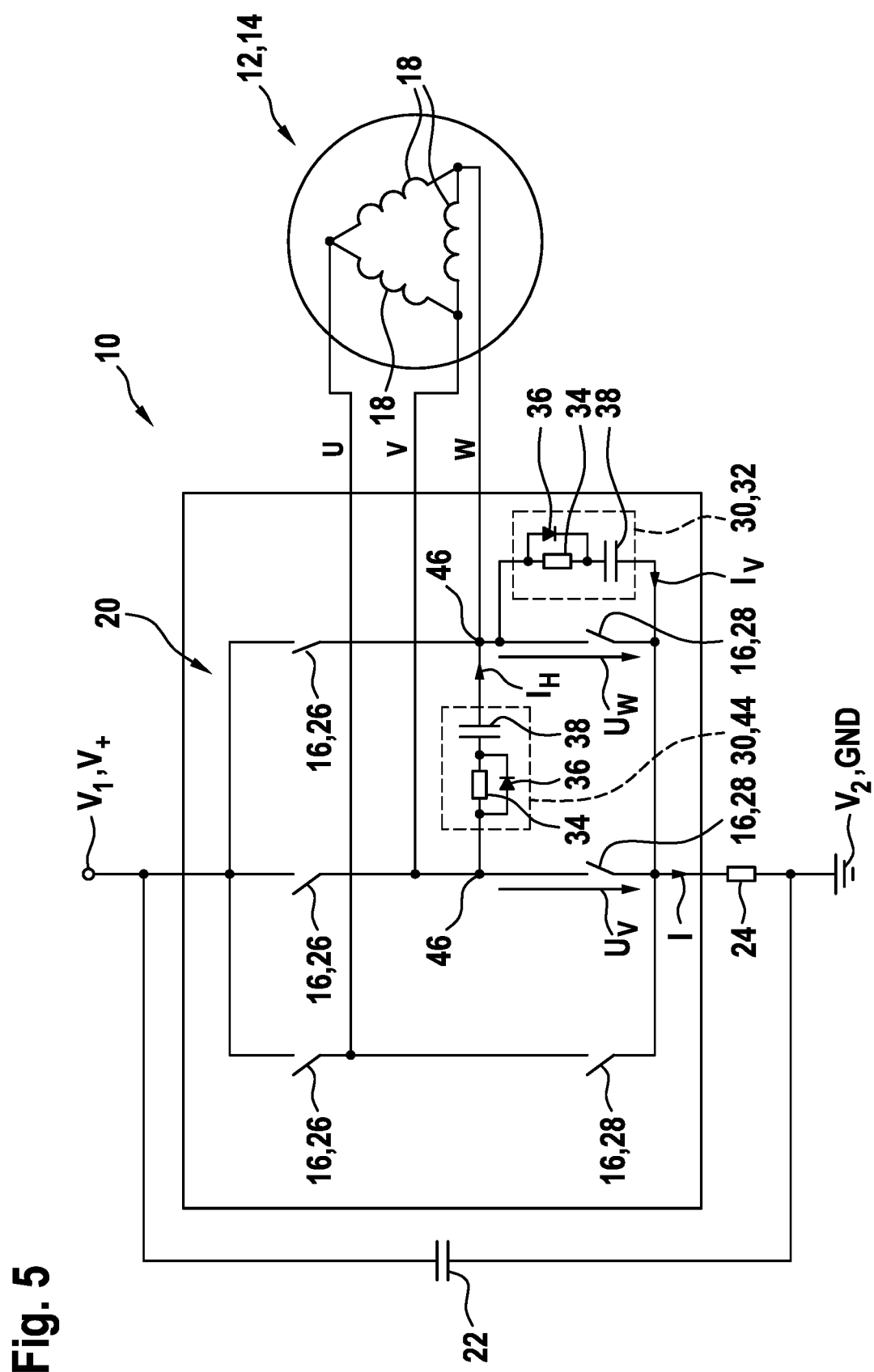
Figure 6:
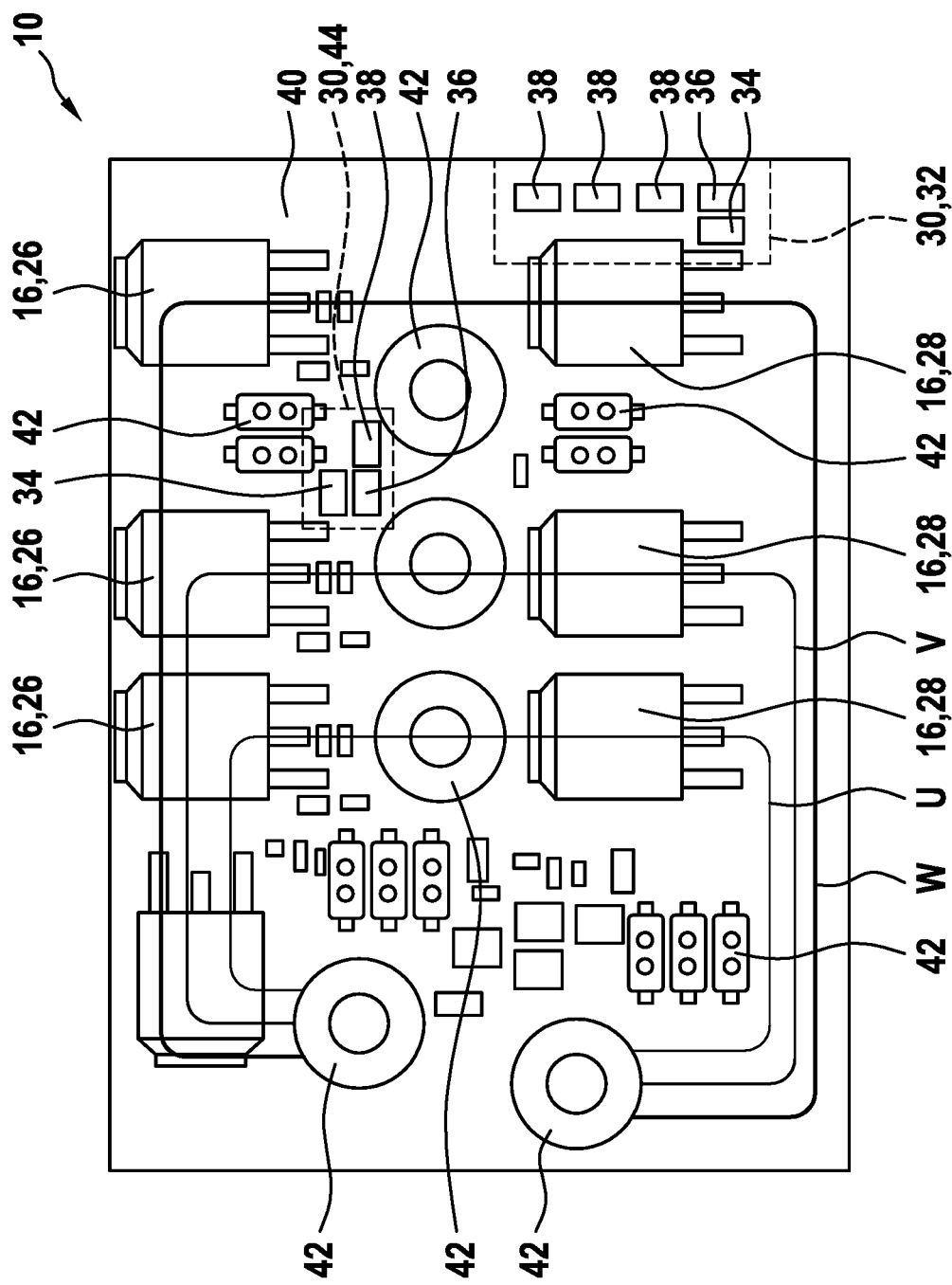
FIG. 6: a schematic representation of the electronics unit according to the disclosure with a printed circuit board according to FIG. 5, FIG. 7: Diagrams of the switching behavior as well as the associated transients for the third embodiment example according to FIGS. 5 and 6 with the low-side power transistor of the first phase switched on (FIG. 7*a*) and with the low-side power transistor of the first phase switched off (FIG. 7*b*)
Figure 7A:
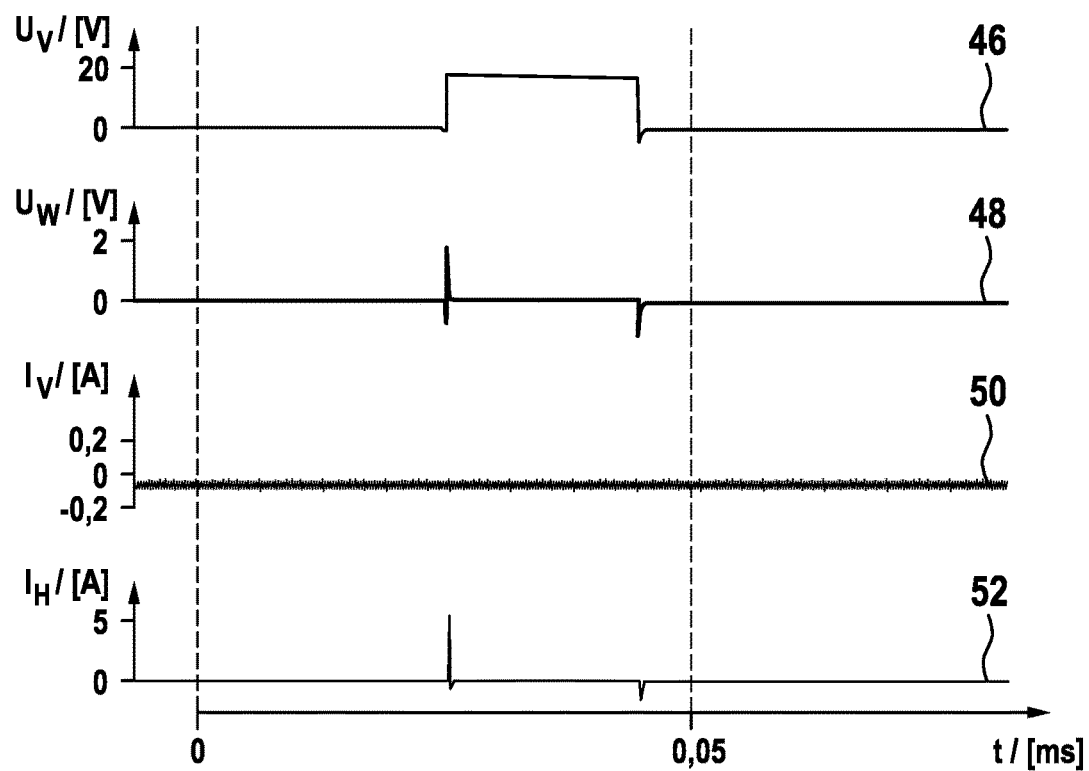
Figure 7B:
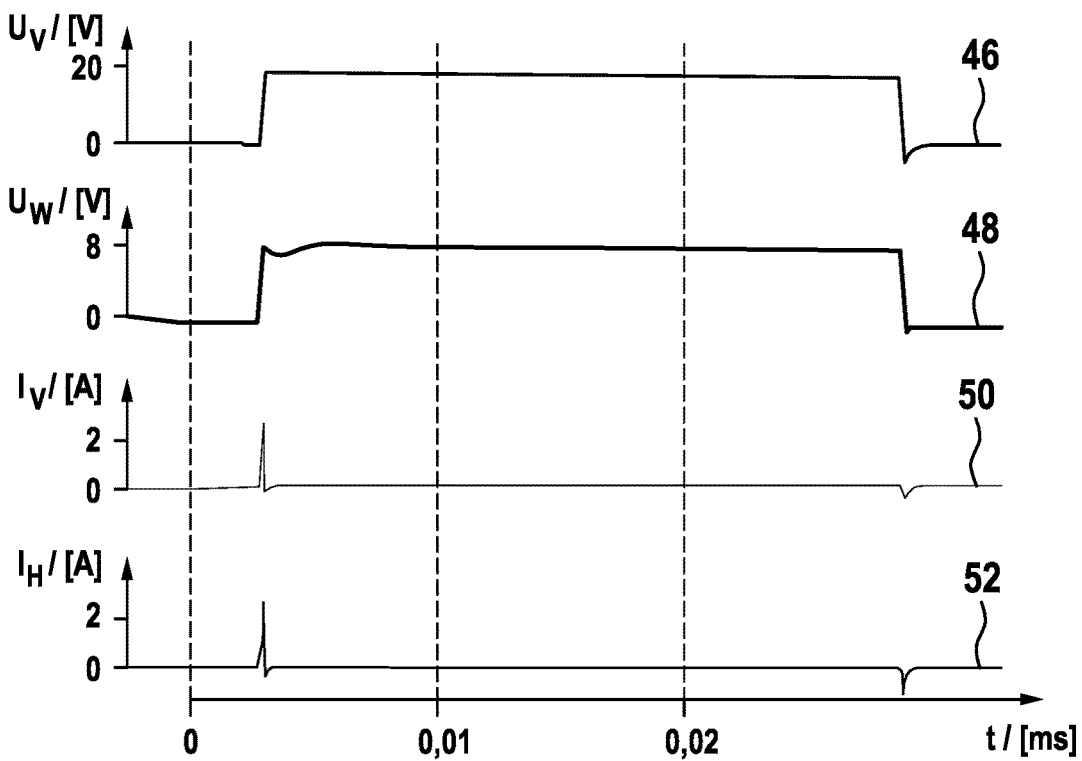

FIG. 7 shows two diagrams of the switching behavior and the associated transients for the third embodiment example according to FIGS. 5 and 6. FIG. 7a shows the behavior with the low-side power transistor 28 of the first phase W switched on and FIG. 7b with the low-side power transistor 28 switched off accordingly. Denoted by 46 and 48 are the voltage waveforms $U_V$ and $U_W$ at the nodes 46 of the two phases V and W in volts [V], while 50 and 52 denote the time waveforms of the currents $I_V$ and $I_H$ in the vertical snubber 32 and horizontal snubber 44, respectively, in amperes [A]. The current waveforms 50 and 52 were measured with a so-called Rogowski coil across the respective capacitors 38 of the snubber 30, resulting in a slight offset which, however, is of no significance for the disclosure. In addition, it should be noted that the waveforms shown are for illustration of the operation of the snubber 30 and therefore do not correspond to the typical PWM pattern for actuating a three-phase electric motor.

FIG. 7a shows that switching on and off the low-side power transistor 28 of the second phase V (cf. voltage waveform 46) when the low-side power transistor 28 of the first phase W is switched on or closed leads to transients or positive or negative voltage peaks in the associated voltage waveform 48. These voltage peaks are not absorbed by the vertical snubber 32 connected in parallel to it due to the switched-on low-side power transistor 28 of the first phase W, as can be seen from the associated current waveform 50. Rather, the horizontal snubber 44 absorbs them between the nodes 46 of phases V and W, resulting in a correspondingly effective damping. When the low-side power transistor 28 of the first phase W is opened and closed simultaneously with the low-side power transistor 28 of the second phase V, as shown in FIG. 7b, both the vertical snubber 32 and the horizontal snubber 44 pick up the resulting transients, as can be seen from the associated waveforms 50 and 52 of currents $I_V$ and $I_H$.

In the third embodiment example according to FIGS. 5 to 7, snubbers 30 formed as RDC elements were used, each of which employed a resistor 34 with a resistance value of 10 ohms and a capacitor 38 with a capacitance of 22 nF. As already mentioned above, these values and the resulting time constants depend, among other things, on the minimum turn-on times of the power transistors 16 in order to achieve, on the one hand, the most effective damping of the transients and, on the other hand, a sufficiently fast discharge of the capacitor 38.

Figure 8:
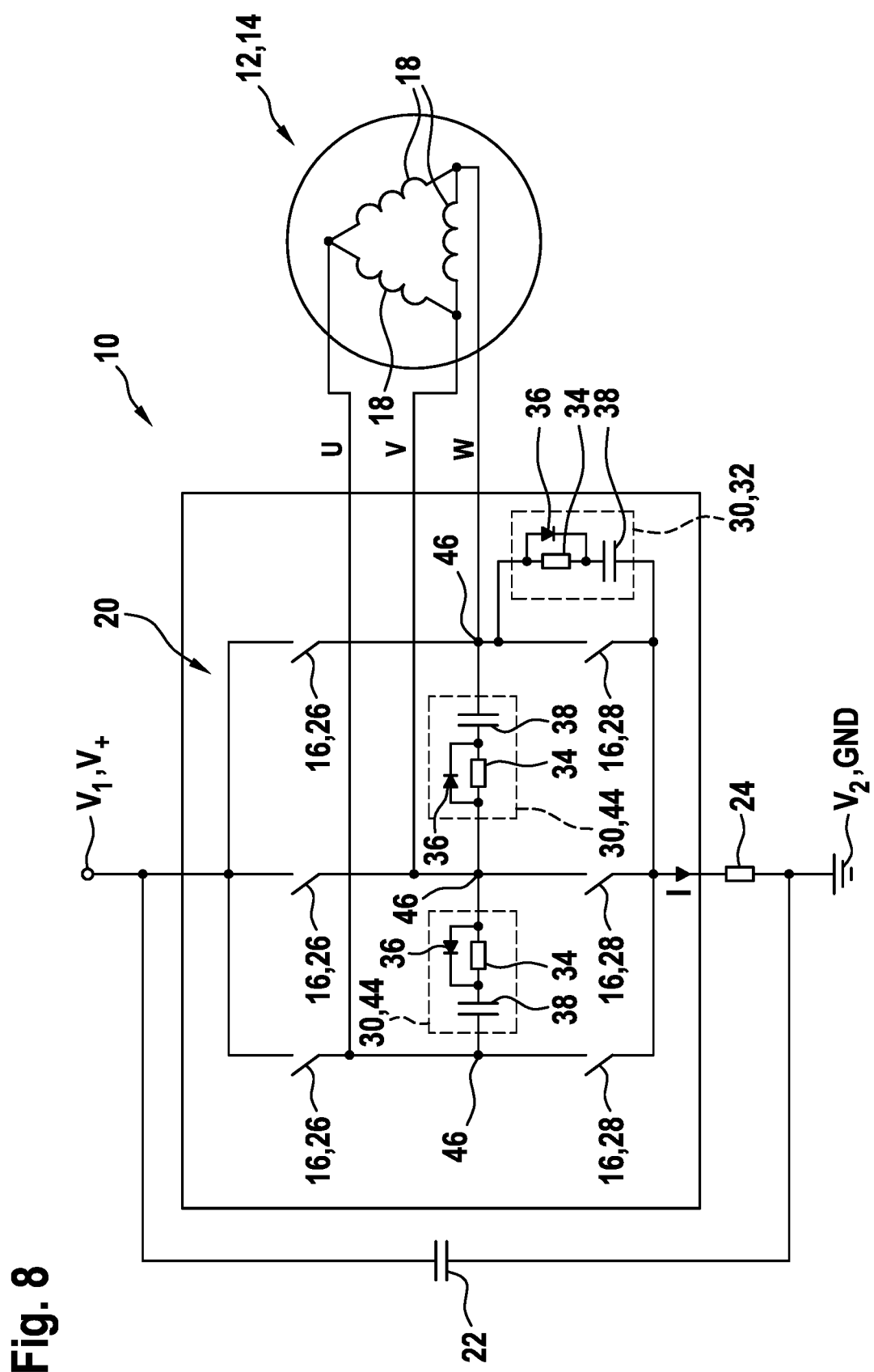
FIG. 8: a circuit diagram of the electronics unit according to the disclosure for actuating a three-phase electric motor in a fourth embodiment.

FIG. 8 shows a fourth embodiment example of the electronics unit 10 according to the disclosure, which differs in particular from the third embodiment example according to FIGS. 5 and 6 by another horizontal snubber 44 between the second phase V and the third phase U. Here, in each case a node 46 between the low-side power transistor 28 and the high-side power transistor 26 of the second phase V and the third phase W is connected to the further horizontal snubber 44. The further horizontal snubber 40 thus represents a third damping element 30 which, in conjunction with the horizontal snubber 44 between the first phase W and the second phase V, attenuates the transients of the low-side power transistor 28 of the second phase depending on the PWM clocking of the associated power transistors 16 in both current flow directions across the first phase W with the highest leakage inductance and the third phase U with the lowest leakage inductance. For this purpose, the third damping element 30 or its diode 36 is poled in the opposite direction with respect to the second damping element 30 or its diode 36.

Thus, when the low-side or high-side power transistor 28, 26 in the third phase U is permanently switched through and the power transistors 16 in phase V are clocking at a certain rotor position of the electric motor 14, the transients of phase V are predominantly dissipated via the horizontal snubber 44 between phase V and phase U. On the other hand, if the low-side or high-side power transistor 28, 26 in the first phase W is permanently switched through and the power transistors 16 in phase V are clocking when the rotor of the electric motor 14 is in a different position, the transients from phase V are predominantly dissipated through the horizontal snubber 44 between phase V and phase W. Therefore, the transients always prefer the path of the smallest impedance. Two horizontal snubbers 44 on the second phase V thus have the advantage that the impedances mean that the power loss is divided between the two snubbers 44 and the corresponding components can be smaller or less powerful with the greatest possible attenuation of the transients, which saves both costs and installation space. In addition, the leakage inductances of the phases U, V, W are not increased by the horizontal snubber 44 in this case either.

Finally, it should be noted that the disclosure is not limited to the shown embodiment examples according to FIGS. 1 to 7, nor to the shapes and proportions of the electrical components, nor to the number and configuration of the plug-in and screw connections 42 of the electronics unit 10. Moreover, the disclosure can also be used for electronics units 10 with multilayer printed circuit boards by designing the damping element network taking into account the leakage inductance and the load current change dI/dt of the particular application.

The invention claimed is:

1. An electronics unit for an electrical device comprising:
   a printed circuit board having a plurality of power transistors configured to actuate a multiphase load of the electrical device,
   wherein each phase of the multiphase load is assigned at least one power transistor of the plurality of power transistors,
   wherein at least one of the power transistors of the plurality of power transistors of a first phase of the multiphase load with a highest leakage inductance has a first electrical damping element connected in parallel and configured to attenuate transients caused by switching processes of the plurality of power transistors, and no corresponding electrical damping element is provided for at least one remaining phase of the multiphase load, and
   wherein the at least one remaining phase has a lowest leakage inductance of the phases of the multiphase load.

2. The electronics unit according to claim 1, wherein:
   a plurality of high-side power transistors of the plurality of power transistors are operably connected to a first reference potential, each phase of the multiphase load assigned a high-side power transistor of the plurality of high-side power transistors, and
   a plurality of low-side power transistors of the plurality of power transistors are operably connected to a second reference potential.

3. The electronics unit according to claim 2, wherein the first electrical damping element is connected in parallel with (i) a low-side power transistor of the plurality of low-side power transistors of the first phase, or (ii) a high-side power transistor of the plurality of high-side power transistors of the first phase.

4. The electronics unit according to claim 3, further comprising:
   at least one second electrical damping element connected in parallel with (i) a low-side power transistor of the plurality of low-side power transistors of at least a second phase of the multiphase load, or (ii) a high-side power transistor of the plurality of high-side power transistors of at least the second phase.

5. The electronics unit according to claim 1, further comprising:
   at least a second electrical damping element connected between the first phase of the multiphase load and a second phase of the multiphase load.

6. The electronics unit according to claim 5, wherein the at least one second electrical damping element is connected between the first phase and the second phase of the multiphase load, such that the at least one second electrical damping element is connected to a node between each of the low-side power transistors and the high-side power transistors of the first phase and the second phase of the multiphase load.

7. The electronics unit according to claim 4, wherein the second phase of the multiphase load has a second highest leakage inductance.

8. The electronics unit according to claim 4, further comprising:
   at least one third damping element acting with respect to a third phase of the multiphase load is additionally provided for the second phase of the multiphase load.

9. The electronics unit according to claim 8, wherein the at least one second damping element and/or the at least one third electrical damping element is configured as resistor-diode-capacitor element ("RDC element") having in each case at least one resistor, a diode, and a capacitor.

10. The electronics unit according to claim 1, wherein the power transistors of the plurality of power transistors are configured as metal-oxide-semiconductor field-effect transistors ("MOSFETs").

11. A motor-driven electrical device, comprising:
    a multiphase load; and
    an electronics unit operably connected to the multiphase load, the electronics unit including a printed circuit board having a plurality of power transistors configured to actuate the multiphase load,
    wherein each phase of the multiphase load is assigned at least one power transistor of the plurality of power transistors,
    wherein at least one of the power transistors of the plurality of power transistors of a first phase of the multiphase load with a highest leakage inductance has a first electrical damping element connected in parallel and configured to attenuate transients caused by switching processes of the plurality of power transistors, and no corresponding electrical damping element is provided for at least one remaining phase of the multiphase load, and
    wherein the at least one remaining phase has a lowest leakage inductance of the phases of the multiphase load.

12. The motor-driven electrical device according to claim 11, wherein:
    the multiphase load is a three-phase electronically commutated ("EC") motor, and
    the electronics unit comprises a B6 power bridge configured to actuate the EC motor.

* * * * *